United States Patent [19]

Kokunishi et al.

[11] Patent Number: 4,897,638

[45] Date of Patent: Jan. 30, 1990

[54] METHOD FOR GENERATING CHARACTER PATTERNS WITH CONTROLLED SIZE AND THICKNESS

[75] Inventors: Motohide Kokunishi; Tetsuzou Uehara, both of Tokyo; Satoru Sakamoto, Ome; Mamoru Tada, Kadaira, all of Japan

[73] Assignee: Hitachi, Ltd., Tokyo, Japan

[21] Appl. No.: 155,062

[22] Filed: Feb. 11, 1988

[30] Foreign Application Priority Data

Feb. 27, 1987 [JP] Japan .................................. 62-42553
Mar. 6, 1987 [JP] Japan .................................. 62-50031

[51] Int. Cl.$^4$ ............................................... G09G 1/16
[52] U.S. Cl. ....................................... 340/751; 340/731
[58] Field of Search ............... 340/731, 735, 790, 739, 340/748, 744, 751; 364/518–521

[56] References Cited

U.S. PATENT DOCUMENTS

| 4,338,673 | 7/1982 | Brown | 340/731 |
| 4,675,830 | 6/1987 | Hawkins | 340/731 |
| 4,748,443 | 5/1988 | Uehara et al. | 340/751 |

OTHER PUBLICATIONS

"Postscript Language Tutorial and Cookbook" by Adobe Systems, Inc. (Addision-Wesley Publishing 1985) pp. 97-99, 219-221.

Kikuchi et al., "High Quality Chinese Character Font Generation Method Based Upon Positioning of Parametric Basic Elements to a Character" (Proceedings of 28th National meeting of Information Processing Society of Japan, pp. 1435-1436, 1984).

*Primary Examiner*—David K. Moore
*Assistant Examiner*—Jeffery A. Brier
*Attorney, Agent, or Firm*—Antonelli, Terry & Wands

[57] ABSTRACT

Skeleton pattern data and stroke thickness data are stored for each character composed of a plurality of strokes, and desired skeleton pattern data are converted into skeleton data enlarged or reduced by a scaling factor. Thickness data of the strokes after the scaling are generated based on the stroke thickness data and the scaling factor. An outline of each stroke of the character is generated based on the skeleton pattern data and the stroke thickness data to thereby generate outline pattern data of the character. When generating the outline pattern data based on the skeleton pattern data, a value different from the scaling factor for the skeleton pattern data is determined as a thickness scaling factor for the stroke of the character.

35 Claims, 16 Drawing Sheets

FIG. 7A

| CHARACTER PATTERN SCALING FACTOR | STROKE THICKNESS SCALING FACTOR |
|---|---|
| ≥3.0 | CHARACTER PATTERN SCALING FACTOR ×1.4 |
| ≥1.5, <3.0 | CHARACTER PATTERN SCALING FACTOR ×1.2 |
| ≥0.8, <1.5 | CHARACTER PATTERN SCALING FACTOR ×1.0 |
| ≥0.4, <0.8 | CHARACTER PATTERN SCALING FACTOR ×0.8 |
| ≥0.2, <0.4 | CHARACTER PATTERN SCALING FACTOR ×0.6 |
| 0.2< | CHARACTER PATTERN SCALING FACTOR ×0.2 |

FIG. 7B

| CHARACTER PATTERN SCALING FACTOR | STROKE THICKNESS | | | | |
|---|---|---|---|---|---|
| THICKNESS CLASS | 1 | 2 | 3 | 4 | 5 |
| ≥3 | 196 | 168 | 140 | 112 | 84 |
| ≥1.5, <3.0 | 84 | 72 | 60 | 48 | 36 |
| ≥0.8, <1.5 | 35 | 30 | 25 | 20 | 15 |
| ≥0.4, <0.8 | 14 | 12 | 10 | 8 | 6 |
| ≥0.2, <0.4 | 6 | 5 | 4 | 3 | 2 |
| 0.2< | 3 | 2 | 2 | 2 | 1 |

FIG. 10
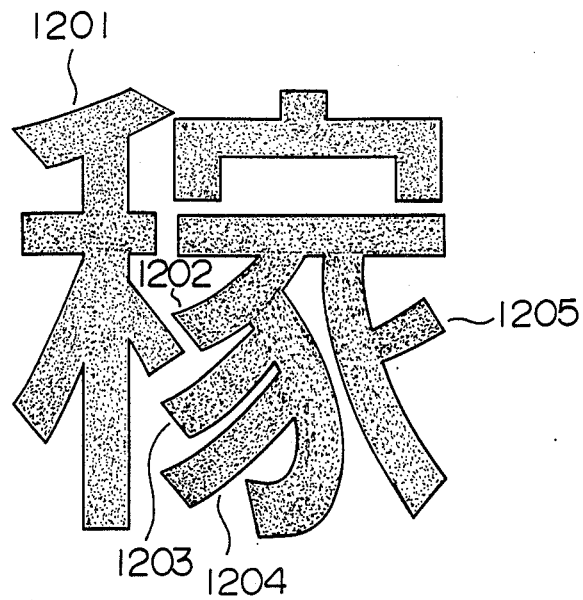
FIG.11A
| PARAMETER<br>EDGE-SIDE SHAPE CLASS | P₁ | P₂ | P₃ |
|---|---|---|---|
| a | 0 | 0 | 0 |
| b | 30 | 15 | 0 |
| c | 30 | 15 | 10 |
FIG.11B
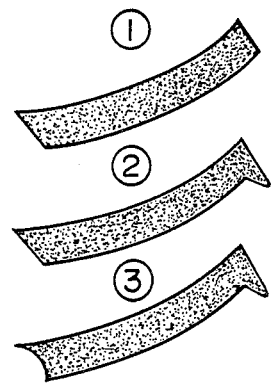

FIG. 13A

| CHARACTER PATTERN SCALING FACTOR | STROKE THICKNESS SCALING FACTOR |
|---|---|
| ≧3.0 | 1.4 |
| ≧1.5, <3.0 | 1.2 |
| ≧0.8, <1.5 | 1.0 |
| ≧0.4, <0.8 | 0.8 |
| ≧0.2, <0.4 | 0.6 |
| <0.2 | 0.2 |

FIG. 13B

| CHARACTER PATTERN SCALING FACTOR / THICKNESS CLASS | STROKE THICKNESS | | | | |
|---|---|---|---|---|---|
| | 1 | 2 | 3 | 4 | 5 |
| ≧3.0 | 49 | 42 | 35 | 28 | 21 |
| ≧1.5, <3.0 | 42 | 36 | 30 | 24 | 18 |
| ≧0.8, <1.5 | 35 | 30 | 25 | 20 | 15 |
| ≧0.4, <0.8 | 28 | 24 | 20 | 16 | 12 |
| ≧0.2, <0.4 | 21 | 18 | 15 | 12 | 9 |
| <0.2 | 7 | 6 | 5 | 4 | 3 |

1701

暇        暇

METHOD FOR GENERATING CHARACTER PATTERNS WITH CONTROLLED SIZE AND THICKNESS

BACKGROUND OF THE INVENTION

The present invention relates to a method for generating the pattern of a character composed of strokes having certain thickness, and more particularly to a method suitable for generating character patterns having various sizes, thicknesses and starting/ending edge-side shapes using a single standard character pattern.

According to one conventional computer technique for outputting character patterns, a method has been adopted wherein a character pattern stored in the form of two-dimensional dot matrix is outputted. With this method, although a stored character pattern itself can be outputted correctly, enlargement, reduction or rotation of a character pattern cannot be done with high quality.

According to another conventional technique, a method has been adopted wherein a character pattern stored in the form of linetone images is displayed or printed out. This method has long been used in the field of X-Y plotters. With this method, it is possible to enlarge or reduce a character size or to rotate a character pattern. However, there is a problem of character quality because the original character pattern is composed of linetone images.

As a method for storing and generating character patterns eliminating the above disadvantages, there is a so-called outline font system now in use. This system is described in "PostScript Language Tutorial and Cookbook" by Adobe Systems, Inc. (Addison-Wesley Publishing, 1985) at pp. 97 to 99, pp. 219 to 221 and other pages. According to this method, the outline of a character pattern is stored in the form of straight lines and curves, and a conversion such as enlargement, reduction, rotation or the like is carried out at the time of outputting of a character pattern. Since the outline of a character pattern is stored graphically, the conversion can be carried out freely. In addition, it is possible to store an original character pattern in the form of an outline with high quality.

According to the conventional outline font system, a modification of a character pattern is performed using a normal size character pattern so that the distance between two points within the character pattern changes in accordance with a scaling factor. Thus, the width (thickness) of a stroke of the normal size character changes to a width determined by the scaling factor of a character size. However, there is a requirement that the thickness of a stroke of a character be enlarged or reduced by an amount not in proportion to the character size. For instance, it often happens that when the character size is doubled, the thickness of a stroke should be enlarged more than double. The above conventional techniques cannot meet such requirements.

Further, character patterns having various stroke thicknesses may be required in some cases, even for the same character size. If character patterns having various stroke thicknesses can be generated based on the same character pattern data, it becomes possible to reduce the number of font storage memories and the cost of generating fonts. The above conventional techniques cannot meet such requirements.

Furthermore, difficulties exist in generating another type of font with a slight change in pattern configuration, such as the presence or absence of a serif. If each outline of the character patterns of various font types is to be stored, the capacity of the font memories and the cost of generating the font become large. Therefore, it is desirable that character pattern of font types with a slight change, such as the presence or absence of a serif or the like, can be generated from standard character pattern data. The above conventional techniques cannot meet such requirements.

Another method of generating character patterns is known which generates a character pattern as a composition of stroke outline patterns (for example, Kikuchi et al, "High quality chinese character font generation method based upon positioning of parametric basic elements to a character", (Proceedings of 28th National meeting of Information Processing Society of Japan, pp. 1435-1436 (1984))). According to this prior art, a stroke outline pattern is first generated for each of the stroke patterns which should form a character. The generation of each stroke pattern is based upon predetermined data which indicate the kind of stroke for each stroke, coordinates of skeleton points which define each stroke, and outline parameter data which define an outline to be generated for each stroke.

The generated stroke outline patterns are arranged at appropriate positions, and the arranged stroke outline patterns are enlarged or reduced depending upon the size of the character pattern to be generated. Thereafter, the stroke outline patterns are painted, so as to obtain a character dot pattern.

This prior art is advantageous in that character patterns of various shapes are easily generated by changing coordinates of skeleton points or by changing the outline parameter data.

This prior art however, still has a disadvantage, as in the aforementioned outline character method, that the character size and the thickness of each stroke pattern cannot be controlled independently.

SUMMARY OF THE INVENTION

It is an object of the present invention to provide a method suitable for generating character patterns of high quality, while providing both the integration of character patterns of a character set and the feasibility of design change, and while avoiding an increase of the number of font memories and the cost of generating font.

To achieve the above object, a combination of three types of character pattern data is used for an expression format of a standard character pattern, the data including skeleton pattern data representative of the class of strokes constituting a character and the coordinates of skeleton points; stroke thickness data (optional) of each stroke; and shape parameter data (optional) representative of the shape of starting/ ending edge-sides. The means used for generating character patterns using the character pattern data are means for scaling the skeleton data, means for determining the thickness of a stroke after scaling, and means for generating outline pattern data for the stroke. Alternatives used for the above means are means for generating outline pattern data based on the standard character pattern and means for scaling the outline pattern data. To achieve the above object, there are futher provided means for storing thickness control data for respective scaling factor ranges of a character size; means for expressing the thickness data of each character stroke as a class among a plurality of classes provided for discriminating the thickness of a character stroke, and further for giving the correspondence between thickness classes and thicknesses; means for giving a thickness ratio representative of a ratio of a base thickness to that after scaling; means for giving angle data of an edge-side of a stroke outline in the direction of stroke thickness for each stroke or for each stroke class; means for giving shape parameter data representative of the shape of starting-/ending edge-sides of a stroke for each stroke or for each stroke class; and means for generating outline pattern data of a character using the above-described data.

Using the three types of character data, outline pattern data generating means can generate a normal size outline pattern of the associated character. Prior to generating an outline character pattern, the skeleton pattern data are processed by scaling means, and means for determining the thickness of a stroke after scaling is used to enable scaling of the character size. In addition, it is possible to set a stroke thickness scaling factor different from a character scaling factor. The thickness of each stroke after scaling can be determined by using data such as the thickness control data for each range of the character size scaling factor, the correspondence data between stroke thickness classes and thicknesses, or the thickness ration when a stroke is generated.

The above procedure is effective for the case where outline pattern data are generated at a normal size and, thereafter, a character pattern having an objective size is generated using means for scaling the outline pattern data.

Using means for generating a character pattern in accordance with the shape parameter data identifying the edge-side angle and starting/ending edge-side shape of a stroke outline, it becomes possible to generate various character patterns having different character styles, i.e., different stroke shapes, based on common skeleton parameter data and thickness data. In the above character pattern generation, if thickness data are stored for each thickness class and if means for giving the correspondence between thickness classes and thicknesses is used, it becomes possible to uniformly and integrally change character patterns of a character set merely by changing the correspondence data between thickness classes and thicknesses, without changing the thickness data. Also in the above character pattern generation, if the shape parameter data are stored for each stroke class, it becomes possible to uniformly change the strokes of the stroke class of a character set. In this case, the shape parameter data for the corresponding stroke class are changed without the necessity of changing the character pattern data of each character. Therefore, it is possible to avoid an increase of character font generating cost and font memory capacity.

BRIEF DESCRIPTION OF THE DRAWINGS

FIGS. 7A and 7B show examples of thickness control data for scaling skeleton point data;

FIG. 10 shows an example of a character generated in accordance with the method of this invention;

FIGS. 11A and 11B show examples of shape parameters and generated strokes, respectively;

FIGS. 13A and 13B show examples of thickness control data used in scaling after the generation of outlines;

DESCRIPTION OF THE PREFERRED EMBODIMENT

An embodiment of the present invention will be described with reference to the accompanying drawings. The character pattern generating method of this embodiment is based on the concept in the field of character design that a character pattern can be expressed by a combination of a relatively small number of stroke classes such as horizontal lines and tail strokes. Means for generating a stroke of each class with high quality is provided. A character is generated from a combination of strokes which are generated by stroke generating means and which are properly disposed relative to each other.

Figure 12:
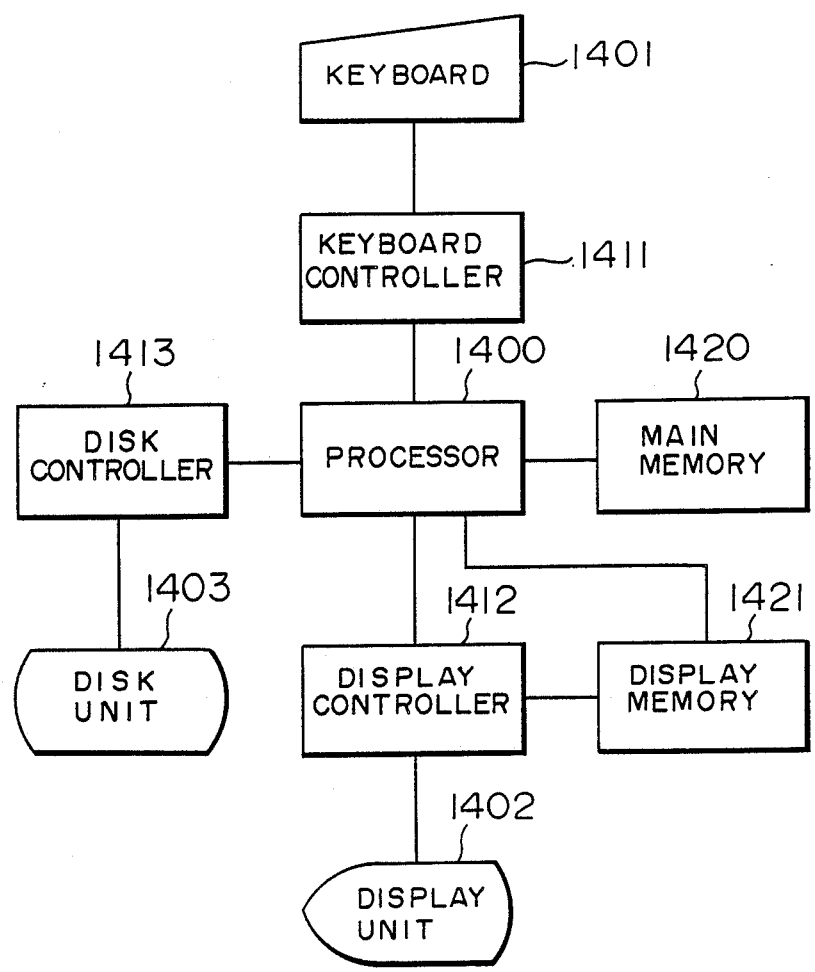
FIG. 12 is a block diagram of hardware, capable of performing an embodiment of the method according to this invention.

FIG. 12 is a block diagram of a hardware arrangement for this embodiment. The hardware arrangement shown in FIG. 12 comprises a processor 1400, a keyboard 1401, a display unit 1402, a disk unit 1403, a keyboard controller 1411 for controlling an input from the keyboard 1401, a display controller 1412 for controlling an output to the display unit 1402, a disk controller 1413 for controlling an input to the disk unit 1403, a main memory 1420, and a display memory 1421 for storing data to be outlined on the display unit.

Designation of a character to be generated, its size and edge-side shape is entered by the keyboard 1401. The generated character is displayed on the display unit 1402. The main memory 1420 stores a character generating program and thickness control data. The character generating program is executed by the processor 1400 to generate a character pattern in accordance with the designated character code, character size and edge-side shape entered by the keyboard 1401 via the keyboard controller 1411. The generated character pattern is stored in the display memory 1421 and displayed on the display unit 1402. The thickness control data will be detailed later.

Figure 6:
FIG. 6 shows the arrangement of skeleton pattern data.

Stored in the disk unit 1403 are skeleton pattern data, shape parameters, edge-side angle data and thickness data. The shape parameters designate the edge-side shape of a stroke, whereas the edge-side angle data determine the edge-side angle. The thickness data designate the stroke thickness at a normal size. The skeleton pattern data designate the position and dimensions of a stroke constituting a pattern, the contents of which for one character are shown in FIG. 6. The skeleton pattern data are mainly divided into four fields. The first field stores a character code identifying a character, the second field the character style, the third field the length of the fourth field, the fourth field data of strokes constituting the character. The top of the fourth field stores the number N of strokes constituting the character. The stroke data is composed of the stroke class, the data amount of the stroke data, and the coordinate sequence of skeleton points constituting the stroke of the associated class.

Figure 5:
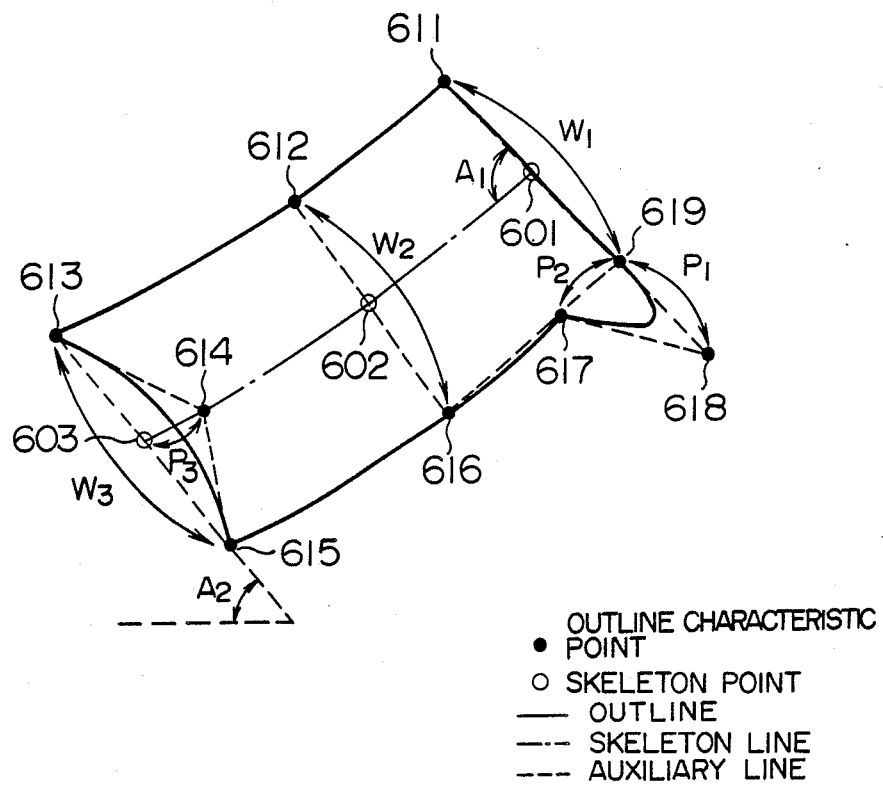
FIG. 5 is a schematic diagram showing the arrangement of a "lefthand-tail" stroke.

To describe particularly the arrangement of skeleton pattern data and its concept, a "lefthand-tail" stroke is used as an example of the stroke class. The lefthand-tail stroke is a stroke obtained by moving a pen from the upper to the leftside down. In an example of a character " 林 " shown in FIG. 10, lefthand tail strokes are represented at 1201, 1202, 1203, 1204 and 1205. The relation between the skeleton pattern data and the shape of a lefthand-tail stroke of a certain character style is shown in FIG. 5. First, second and third skeleton points are represented at 601, 602 and 603, respectively in FIG. 5. For example, in the skeleton pattern data for a character " 林 ", the stroke classes in the 1st, 4th, 11th, 13th, 14th and 15th stroke data of the fourth field shown in FIG. 6 represent "lefthand-tail" strokes. The skeleton coordinate sequence of the stroke data can be expressed on an X-Y cartesian coordinate system, with the assumption that a square encircling the character shown in FIG. 10 is a normal size and an apex at the lower left side is an origin of the X-Y cartesian coordinate system. By properly locating the three skeleton points 601, 602 and 603 of the lefthand-tail stroke shown in FIG. 5 in the X-Y cartesian coordinate system, the lefthand-tail stroke can be located at a suitable position of an objective character, with the size and direction of the stroke properly defined.

Figure 1:
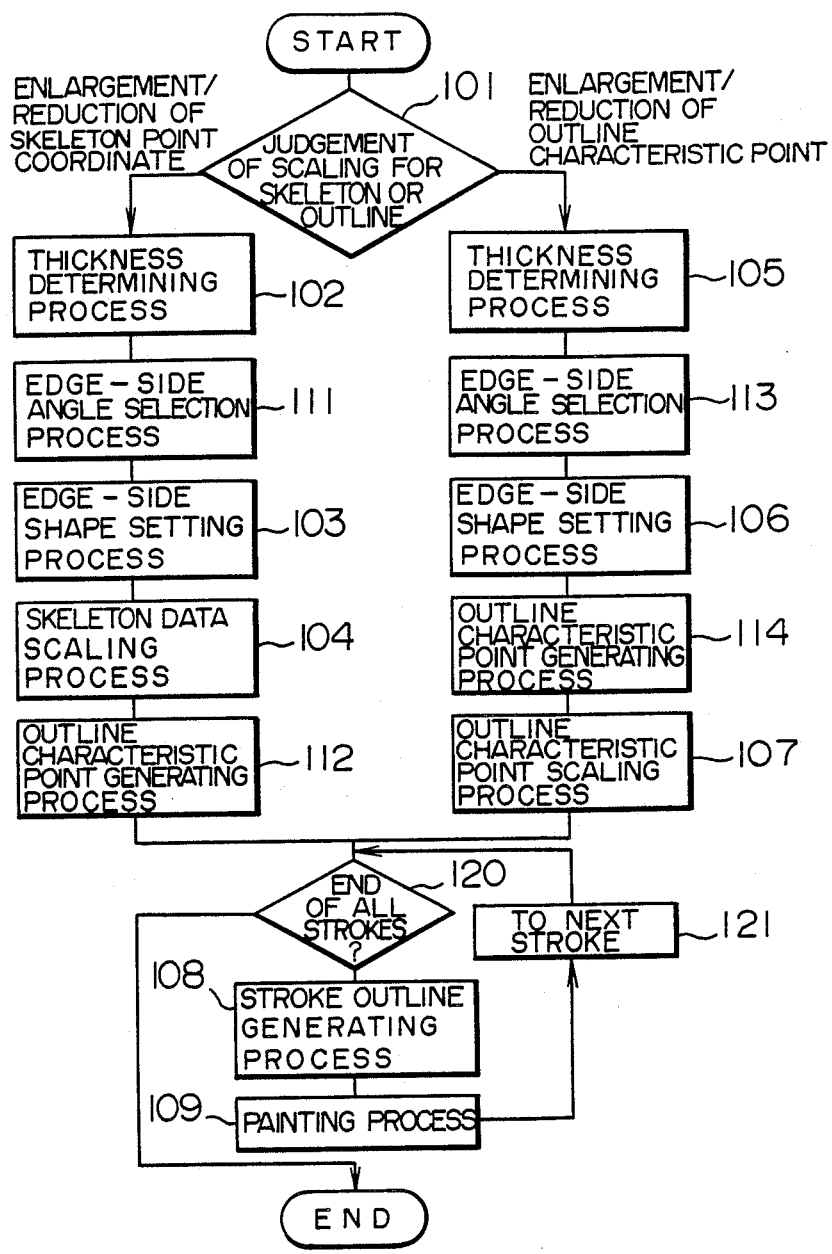
FIG. 1 is a flow chart for an embodiment of a character generating method according to the present invention.

Next, the operation of the character generating program stored in the main memory 1420 shown in FIG. 12 will be described. FIG. 1 shows the outline of the operation of the character generating program. The following two methods can be conducted using this program for the generation of a character of arbitrary size. One method generates an outline of a character pattern after scaling the skeleton point coordinates of the skeleton pattern data. The other method performs scaling after the outline is generated. One of the two methods is selected at step 101 shown in FIG. 1. Each method will now be described.

(A) METHOD OF SCALING SKELETON POINT COORDINATE (A.1) Determining Thickness

Figure 2A:
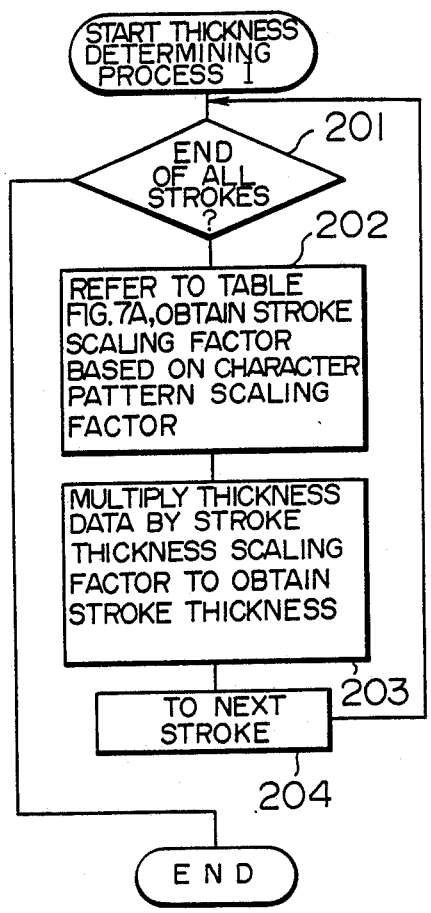
FIGS. 2A and 2B are flow charts for a thickness determining process for the character generating method of FIG. 1.
Figure 2B:
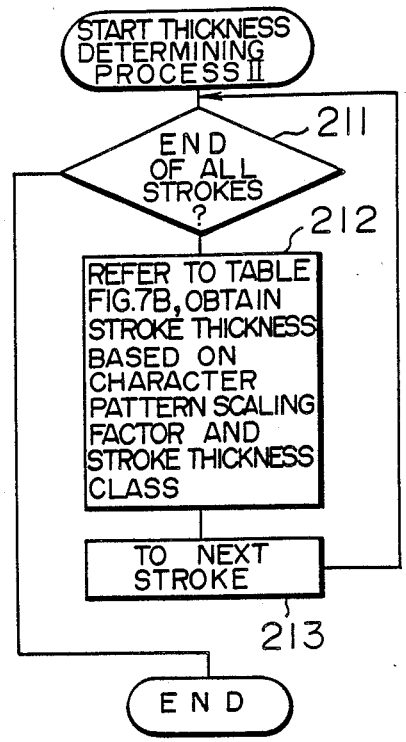
Figure 14:
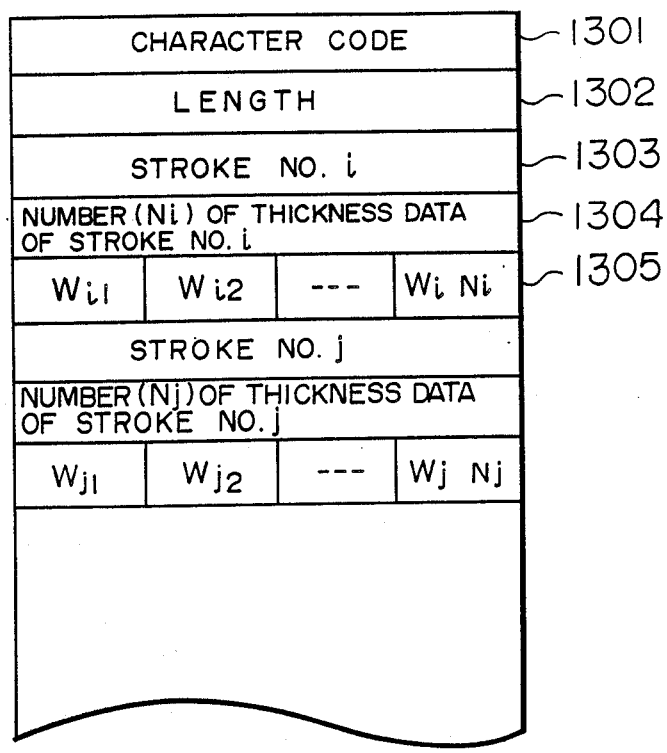
FIG. 14 shows the arrangement of thickness data.

First, the thickness of the stroke to be generated is determined in a thickness determining process 102 which will be described with reference to FIGS. 2A and 2B, FIGS. 7A and 7B and FIG. 14. FIGS. 2A and 2B are flow charts for the thickness determining process, and FIGS. 7A and 7B show examples of tables referred to in the thickness determining process. FIG. 14 shows the arrangement of thickness data, wherein the first field 1301 stores a character code identifying a character, the second field 1302 stores the length of the thickness data for the character, the third field 1303 stores the stroke number, the fourth field 1304 stores the number of thickness data of the associated stroke, and the fifth field 1305 stores the thickness data. The thickness determining process will now be described with reference to FIG. 2A. FIG. 7A shows a correspondence table between the scaling factor of a character pattern and that of a stroke, the latter representing the thickness control data. At step 202 shown in FIG. 2A, the scaling factor of a stroke is obtained from the correspondence table using a character pattern scaling factor. At step 203, the thickness of the stroke concerned is obtained by multiplying the thickness data in the fifth field 1305 shown in FIG. 14 by the scaling factor obtained at step 202. The above process is repeated for all the strokes via step 201 and step 204.

An example of the thickness determining process will now be given. Assuming that the scaling factor of a character pattern including a stroke having thickness data of 30 is 0.5, the stroke thickness is determined as follows: At step 202 using the correspondence table shown in FIG. 7A, the stroke scaling factor Rs for a stroke having a character scaling factor 0.5 is obtained as:

$$Rs = 0.5 \times 0.8 = 0.4$$

This value is multiplied at step 203 by the thickness data 30 to obtain the thickness Ws of a stroke to be generated:

$$Ws = 30 \times 0.4 = 12$$

Thus, the thickness of the stroke to be generated in this example is 12.

Another method for the thickness determining process will be described next by referring to FIG. 2B and FIG. 7B. The process shown in FIG. 2B obtains the thickness control data using the correspondence table between the character pattern scaling factor and the stroke thickness shown in FIG. 7B. As the thickness data, the thickness classes are stored. The thicknesses of strokes of a character set are divided into several levels each of which is given a particular name. The name identifying the thickness level is called a thickness class. In this embodiment, the thickness class is represented by numerals 1 to 5. The thickness determining process 102 determines a thickness of each stroke in accordance with the process shown in FIG. 2B. Referring to FIG. 2B, step 211 determines where the processes for all the strokes of a character concerned have been finished. At step 212, the thickness of a stroke to be generated is determined based on the thickness class obtained from thickness data of the stroke and the character pattern scaling factor. The correspondence table shown in FIG. 7B is used for this purpose. The above procedure is repeated for all the strokes via step 211 and step 213 shown in FIG. 2B.

An example of the above procedure is given in the following: It is assumed that the character pattern scaling factor is 0.5 and the thickness of a stroke belonging to thickness class 2 is determined using the table shown in FIG. 7B. The intersection between the column of thickness class 2 and the row of the character pattern scaling factor with a range from 0.4 inclusive to smaller than 0.8 is found to determine the stroke thickness to be 12.

The following effects can be obtained by the above procedure with which character patterns of various sizes are generated by scaling a single character pattern.

(i) Enlargement

If the character size enlarging factor is the same as the stroke thickness enlarging factor, blank portions between strokes are presented relatively large. With the present procedure, the stroke thickness enlarging factor can be set larger than the character size enlarging factor so that the quality of a character is well maintained.

(ii) Reduction

Figures 17A, 17B, 17C:
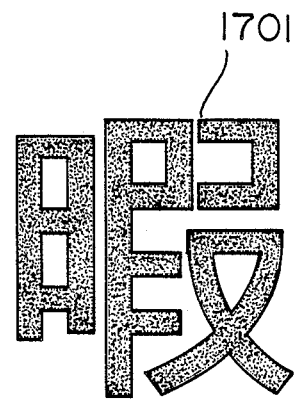
FIGS. 17A, 17B and 17C illustrate the relationship between reduction factors of character size and stroke thickness.

If the character size reduction factor is the same as the stroke thickness reduction factor, blank portions between strokes are presented relatively small. Some blank portions between strokes may disappear, resulting in an incorrect character. With the present procedure, the character size reduction factor can be set larger than the stroke thickness reduction factor so that the quality of a character is well maintained. An example for this is shown in FIGS. 17A, 17B and 17C. FIG. 17A shows an example of a character composed of 384×384 dots (character size scaling factor=1, stroke thickness scaling factor=1). FIG. 17B shows a first example of the same character composed of 80×80 dots (character size scaling factor=80/384, stroke thickness scaling factor=80/384). FIG. 17C shows a second example of the character composed of 80×80 dots (character size scaling factor=80/384, stroke thickness scaling factor=48/384). In the character shown in FIG. 17B where the character size scaling factor is the same as the stroke thickness scaling factor, a space 1701 shown in FIG. 17A is made solid black and the resultant character is not correct. However, in the character shown in FIG. 17C where the character size scaling factor is set larger than the stroke thickness scaling factor, the space 1701 is preserved and the resultant character is correct.

(A.2) Determination of Edge-side Angle

Figure 3:
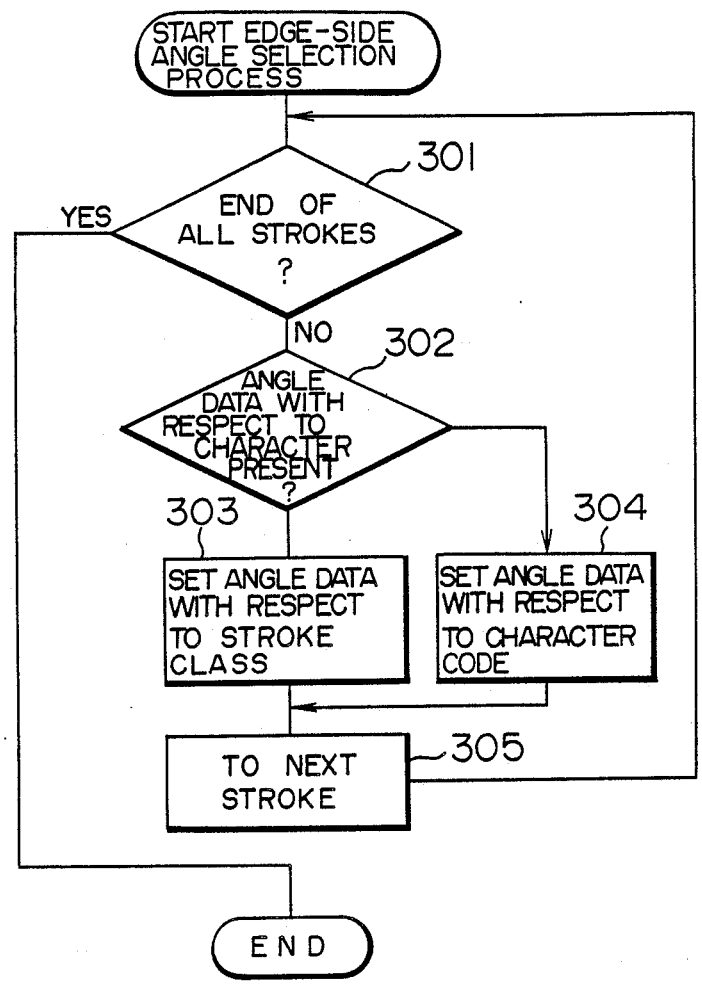
FIG. 3 is a flow chart for an edge-side angle selection process for the method shown in FIG. 1.

Next, the edge-side angles of each stroke are determined at the edge-side angle selection process 111. An edge-side of a stroke means a side either at the starting edge or the ending edge of a stroke in the direction of stroke thickness. An edge-side angle means an angle between an edge-side and a skeleton line of a stroke or a horizontal line of a character frame. For example, in the case of a "lefthand-tail" stroke shown in FIG. 5, the edge-side angle at the starting edge is angle A1, and that at the ending edge is an angle A2. The detail of the edge-side angle selection process 111 is shown in FIG. 3. The edge-side angle of a stroke is determined in this process by one of the following two types of data:

Angle data with respect to character code.
Angle data with respect to stroke class.

The angle data with respect to character code are not essential and they may be or may not be designated by each stroke of a character. It is determined at step 302, shown in FIG. 3, whether the angle data with respect to a character code has been designated for a stroke. If not, the angle data with respect to the stroke class are set as an edge-side angle at step 303. On the other hand if affirmative, the angle data with respect to the character code are set as an edge-side angle at step 304.

Figure 8:
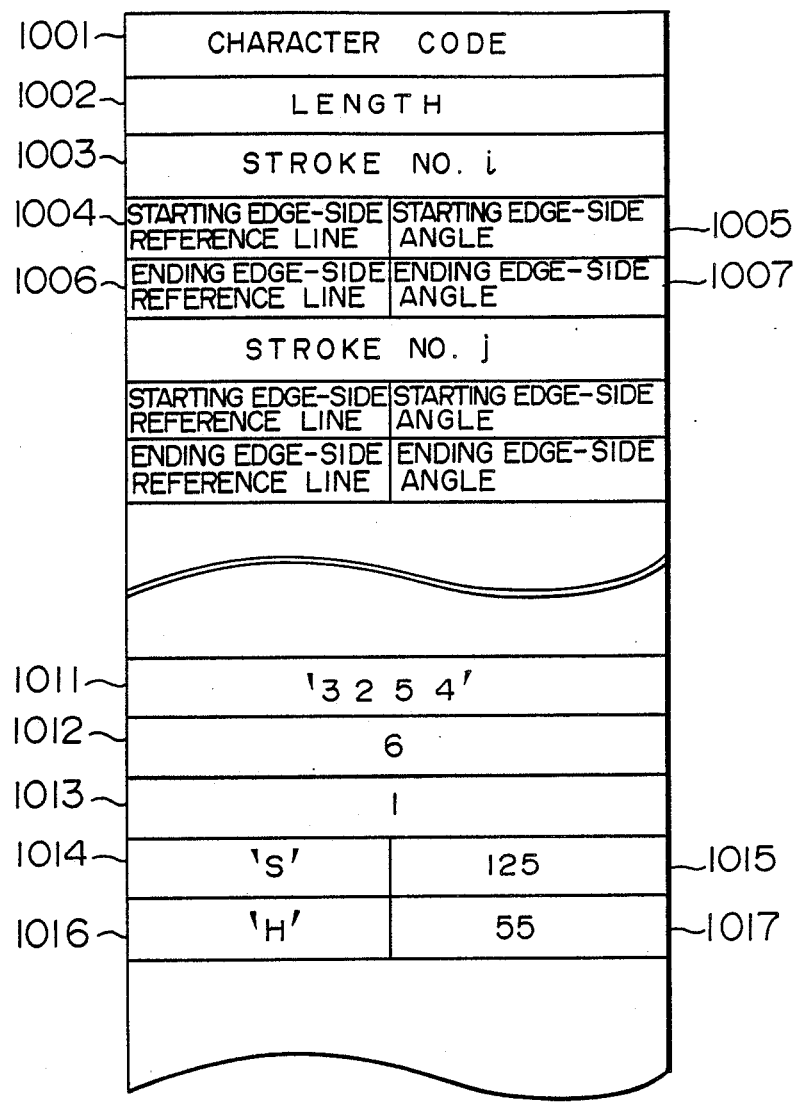
FIG. 8 shows the arrangement and an example of angle data with respect to character.

The contents and formats of the angle data with respect to both character code and stroke class will be described with reference to FIGS. 8 and 9. FIG. 8 shows the format and example of the angle data with respect to the character code. In FIG. 8, stored in field 1001 is a character code, in field 1002 is stored the length of the angle data, and in field 1003 is stored a stroke number whose stroke among the strokes constituting the character designates the angle data with respect to the character code. In this example, in field 1003 a stroke number i is stored. Fields 1004 and 1005 store the starting edge-side angle data of the stroke i, whereas field 1006 and 1007 store the ending edge-side angle thereof. Field 1004 stores the data of the starting edge-side reference line, and field 1005 stores the starting edge-side angle. The starting edge-line reference line stored in field 1004 is a line which gives a reference for the starting edge-side angle, and in this embodiment, it is given as the data for discriminating between the skeleton line and a horizontal line. The starting edge-side angle is an angle between the starting edge-side reference line and the direction of thickness of the stroke number i. Similar data for the ending edge-side are given by the ending edge-side reference line data stored in field 1006 and the ending edge-side angle stored in field 1007.

A particular example of the angle data with respect to character are shown in the lower part of FIG. 8 (following field 1011). Field 1011 stores a character code "3254" for a Kanji (symbolic) character " 林 ". Field 1012 stores the length of the angle data with respect to the character. Field 1013 designates the first stroke (lefthand-tail) of the character. Fields 1014 and 1015 indicate the starting edge-side angle data. 'S' in field 1014 indicates that the reference line is a skeleton line. 125 in field 1015 indicates the edge-side angle is 125 degfees with respect to the reference line (In FIG. 5, A1=125 degrees). Fields 1016 and 1017 indicate the ending edge-side angle data. 'H' in field 1016 indicates that the reference line is a horizontal line. 55 in field 1017 indicates the edge-side angle is 225 degrees with respect to the reference line (In FIG. 5, A2=55 degrees).

Figure 9:
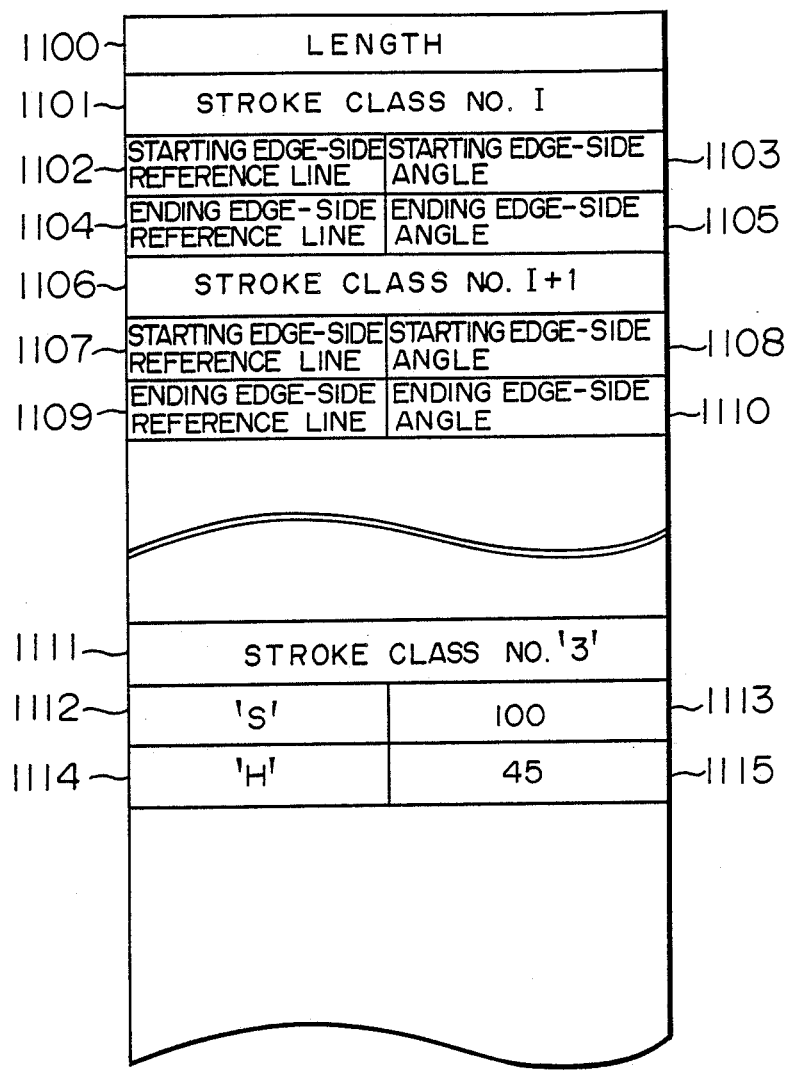
FIG. 9 shows the arrangement and an example of angle data with respect to stroke class.

FIG. 9 shows the format and an example of the angle data with respect to stroke class. Field 1100 stores the length of the angle data. Field 1101 stores a stroke class number which is represented by I. Fields 1102 and 1103 store the starting edge-side angle data of the stroke class I, and fields 1104 and 1105 store the ending edge-side angle data of the stroke class I. Field 1102 stores the starting edge-side reference line, and field 1103 stores the starting edge-side angle. Similar data are stored in fields 1104 and 1105 for the ending edge-side. In fields following field 1106, the starting and ending edge-side angle data for another stroke class are stored. An example of a "lefthand-tail" stroke is shown at the lower portion of FIG. 9. Field 1111 stores a stroke class number ('3' in this case) for the "lefthand-tail" stroke. Fields 1112 and 1113 store the starting edge-side data for the "lefthand-tail" stroke. 'S' in field 1112 indicates that the reference line for the starting edge-side angle of the stroke class concerned is a skeleton line. 100 in field 1113 indicates that the starting edge-side angle of the stroke concerned is 100 degrees. Fields 1114 and 1115 store the ending edge-side angle data.

In the above example, the starting edge-side angle of the "lefthand-tail" stroke class is 100 degrees relative to the skeleton line, and the ending edge-side angle is 45 degrees relative to the horizontal line.

The examples of the angle data with respect to character code and stroke class shown in FIGS. 8 and 9 were supplied to a character " 林 " to generate character pattern as shown in FIG. 10. The classes of strokes 1201, 1202, 1203, 1204 and 1205 shown in FIG. 10 are all "lefthand-tail". That these strokes are "lefthand-tail"

is indicated by the stroke class field in the fourth field of the skeleton pattern data shown in FIG. 6. It is assumed here that the angle data with respect to the character shown in FIG. 8 include only the data associated with the first stroke of the character " 橡 " (corresponding to character code '3254'). In this case, at the edge-side angle selection process shown in FIG. 3, the edge-side angles of the first stroke 1201 only are set using the angle data with respect to the character code such that the starting edge-side angle is 125 degrees relative to the skeleton line and the ending edge-side angle is 55 degrees relative to the horizontal line. The other edge-side angles of the strokes 1202, 1203, 1204 and 1205 are set using the angle data with respect to stroke class such that the starting angle is 100 degrees relative to the skeleton line and the ending edge-side angle is 45 degrees relative to the horizontaol line. As a result, the edge-side angle of the first stroke 1201 can be set at different values from the other "lefthand-tail" strokes 1202, 1203, 1204 and 1205, to thus enable obtaining a character of good quality.

A method of setting the thickness and edge-side angle of each stroke of a character using the thickness determining process 102 and the edge-side angle selection process 111 shown in FIG. 1 has been thus described.

(A.3) Process of Setting Edge-side Shape

Figure 4:
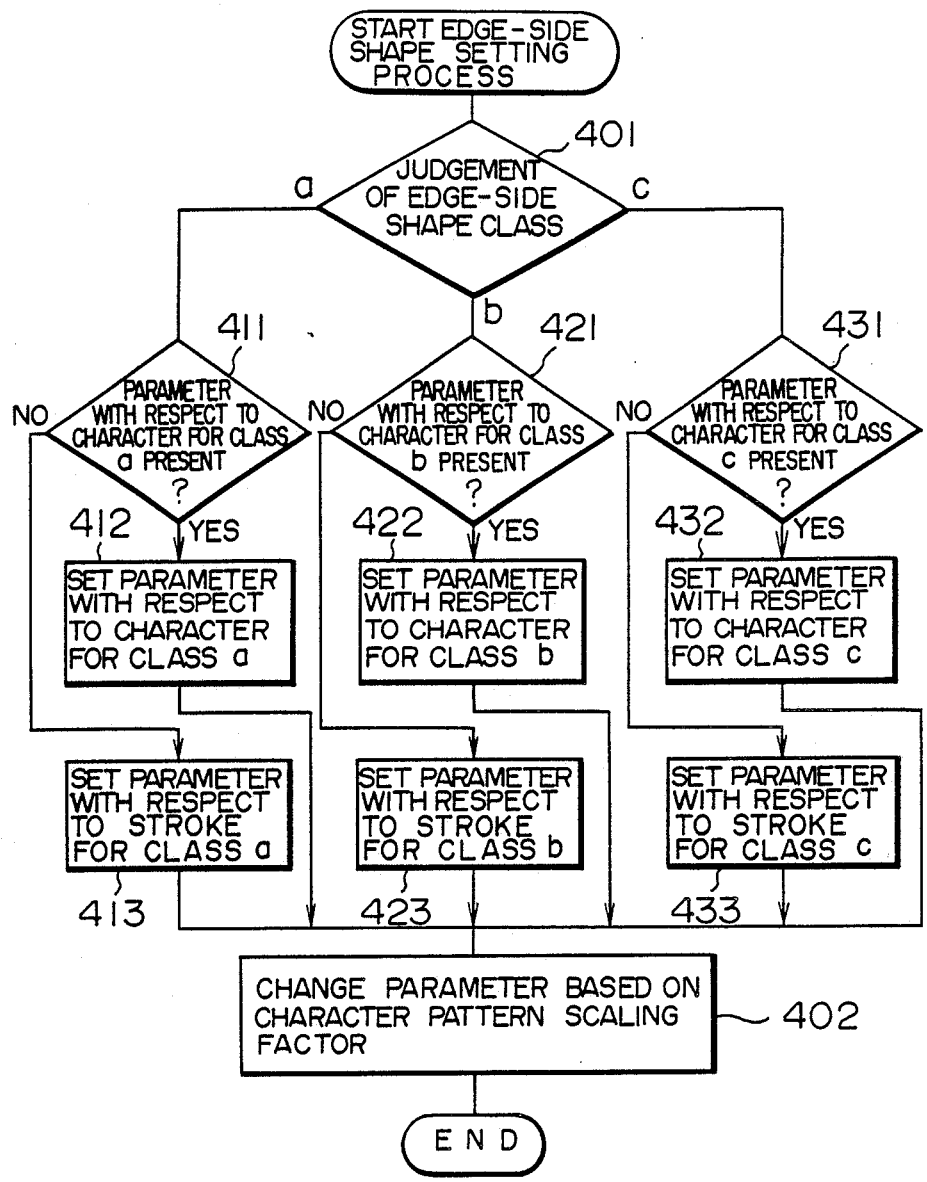
FIG. 4 is a flow chart for an edge-side shape setting process for the method shown in FIG. 1.

Next the edge-side shape setting process 103 shown in FIG. 1 will be described. Shape parameter data are determined by this process. FIG. 4 is a flow chart illustrating the edge-side shape setting process. At step 401, an edge-side shape class entered by the keyboard 1401 shown in FIG. 12 is judged. Even a stroke of a same class can have various edge-side shapes in line with a character design policy. In the case of a "lefthand-tail" stroke for example, the starting edge-side may be added with a serif or not, and the ending edge-side is a straight line or a curve. Various modified examples of the edge-side shape of a "lefthand-tail" stroke are shown in FIG. 11B. FIG. 11B (1) is an example of a stroke without a serif at the starting edge-side and with a straight line at the ending edge-side, FIG. 11B (2) is an example of a stroke with a serif at the starting edge-side and a straight line at the ending edge-side, and FIG. 11B (3) is an example of a stroke with a serif at the starting edge-side and a curve at the ending edge-side. In this embodiment, these three types of shapes of a "lefthand-tail" stroke are controlled by three types of parameters P1, P2 and P3. The correspondence between the edge-side shape class and the value of parameter P1, P2, P3 is shown in the table of FIG. 11A. The "lefthand-tail"strokes (1), (2) and (3) are generated when edge-side shape classes a, b, and c are designated, respectively. Parameters P1 and P2 determine the shape of a serif, and parameter P3 determines the shape of an ending edge-side. The edge-side shape class is judged at step 401 of FIG. 4. If the edge-side shape class is determined as a, judgement step 411 is executed, if b judgement step 421, and if c judgement step 431. The following description is directed to the case where the edge-side shape class is a. Similar to the edge-side angle data described previously, parameters P1, P2 and P3 have the following two types of data for each edge-side shape class:

Parameter data with respect to character code.
Parameter data with respect to stroke code.

The parameter data with respect to character code is not essential, and may be designated or may not be designated by a character or its stroke. It is determined at step 411 if the parameter data with respect to character code for the edge-side shape class a have been designated. If designated, the parameter data with respect to character code for the edge-side class a are selected at step 412. On the other hand if not designated, the parameter data with respect to stroke class for the edge-side shape class a are selected at step 413. The selected parameter data are those values for a normal size. At step 402, the parameter data are changed to have values corresponding to a character pattern scaling factor. Particularly, the stoke thickness scaling factor is obtained based on the character pattern scaling factor by using the table shown in FIG. 7A, and the parameter data as described previously are multiplied by the obtained stroke thickness scaling factor. In the case of a "lefthand-tail" stroke for example, if the character pattern scaling factor for a stroke shape (3) in FIG. 11B is 0.5, then the stroke thickness scaling factor Rs at the corresponding row with a range from 0.4 inclusive to smaller than 0.8 is obtained as:

$$Rs = 0.5 \times 0.8 = 0.4$$

This parameter data P1, P2 and P3 are multiplied by this value as in the following:

$$P1 = 30 \times 0.4 = 12$$

$$P2 = 15 \times 0.4 = 6$$

$$P3 = 10 \times 0.4 = 4$$

As a result, the parameter data for the "lefthand-tail" stroke to be generated in this example are determined as 12, 6 and 4, respectively.

Figure 15:
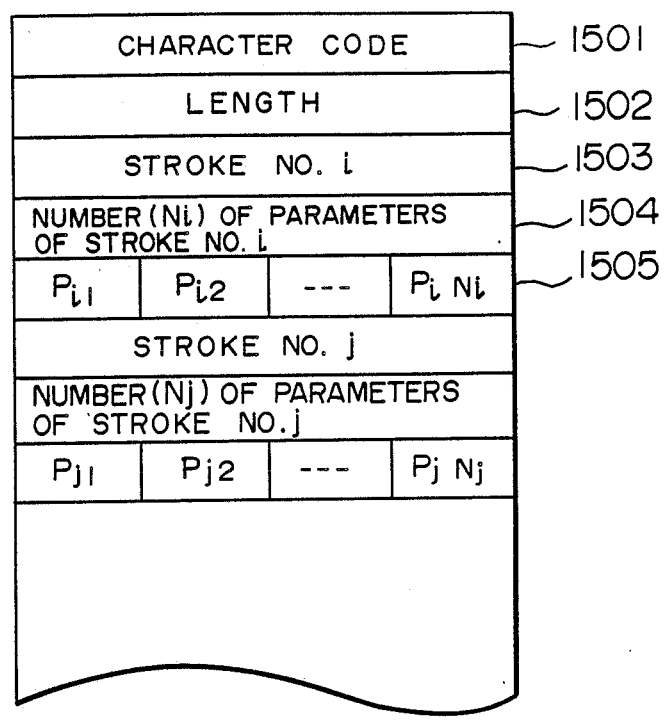
FIG. 15 shows the arrangement of parameters with respect to character code.
Figure 16:
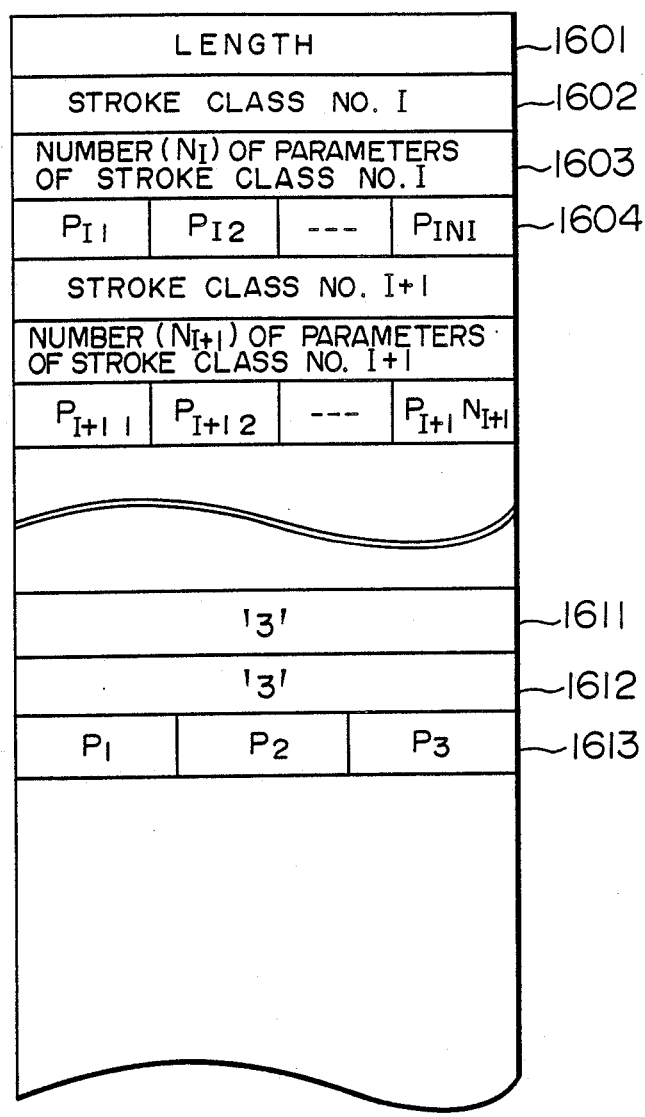
FIG. 16 shows the arrangement of parameters with respect to stroke class.

Next, the formats of the parameter data with respect to character code and stroke class will be described referring to FIGS. 15 and 16. FIG. 15 shows the format of the parameter data with respect to character code. In FIG. 15, a first field 1501 stores a character code, a second field 1502 stores the length of the parameter data of the character, a third field 1503 stores a stroke number whose stroke among the strokes constituting the character designates the angle data with respect to the character code, a fourth field 1504 stores the number of parameter data of the stroke, and a fifth field 1505 stores the parameters of the stroke. FIG. 16 shows the format of the parameter data with respect to stroke class, which are stored for each edge-side shape class for all the strokes. In FIG. 16, a first field 1601 stores the length of the parameter data, a second field 1602 stores a stroke class number, a third field 1603 stores the number of parameter data of a stroke class number I, and a fourth field 1604 stores the parameter data for the stroke.

An example of the parameter data of a "lefthand-tail" stroke is shown at the lower portion of FIG. 16. Field 1611 stores the stroke class number of a "lefthand-tail" stroke, field 1612 stores the number ('3') of parameter data of the "lefthand-tail" stroke, and field 1613 stores the parameter data P1, P2 and P3. These parameter data P1, P2 and P3 correspond to those P1, P2 and P3 shown in the table of FIG. 11A.

With the above process, a plurality of character patterns different in design can be generated from a single character pattern. Further, providing the parameter data with respect to a character code enables improvement in the character quality.

(A.4) Scaling Process for Skeleton Point Data

Next, the skeleton point data scaling process 104 shown in FIG. 1 will be described. The skeleton point coordinate sequence in the fourth field shown in FIG. 6 is subjected to enlargement/reduction by this process. In the skeleton coordinate sequence, the position and thickness of a stroke of a normal size character are stored in the form of an X-Y coordinate sequence. By multiplying the skeleton coordinates by the scaling factor designated from the keyboard 1401 shown in FIG. 12, skeleton pattern data of a desired size can be obtained.

As understood from the foregoing description, steps 102, 111, 103 and 104 operate independently and the execution order can be set as desired.

(A.5) Generation of Characteristic Point of Outline Curve

With the above-described processes, the stroke thickness, edge-side angle, edge-side shape parameter data and skeleton pattern data have been obtained. A process of generating a stroke outline using these data will be described next, taking a "lefthand-tail" stroke as an example. First, the coordinates of points (called outline characteristic points) are obtained at step 112 which points are used as references for generating a stroke outline curve. The outline characteristic point generating process 112 will be described by referring to FIG. 5. In FIG. 5, points 601, 602, and 603 are skeleton points, points 611, 612, 613, 614, 615, 616, 617, 618 and 619 are outline characteristic points, angle A1 is a starting edge-side angle, angle A2 is an ending edge-side angle, W1, W2 and W3 are stroke thicknesses, P1, P2 and P3 are parameters for determining the edge-side shape of a stroke. A line interconnecting skeleton points is called a skeleton line. This method of obtaining the coordinates of outline characteristic points, using the stroke thickness, edge-side angle, and parameters for determining edge-side shape, will now be described. The coordinates of the outline characteristic points of the "lefthand-tail" stroke are defined as follows: Point 611 is on a half straight line, obtained by rotating a skeleton line interconnecting skeleton points 601 and 602 to the right about skeleton point 601 by angle A1 and is spaced from skeleton point 601 by W1/2; point 619 is on a half straight line, in point symmetry with the first-mentioned half straight line relative to skeleton point 601 and is spaced from skeleton point 601 by W1/2; point 618 is spaced from skeleton point 601 by W1/2+distance defined by parameter p1; and point 612 is on a bisector of an angle, defined by lines interconnecting skeleton points 601, 602 and 603 and is spaced from skeleton point 602 by W2/2 and on the side of point 611, and point 616 is similarly located on the opposite side of point 611. Point 617 is on a line segment interconnecting points 619 and 616 and is spaced from point 619 by a distance defined by parameter P2; point 614 is on a skeleton line interconnecting skeleton points 602 and 603 and is spaced from skeleton point 603 by a distance defined by parameter P3; point 613 is on a straight line passing through skeleton point 603 and having an angle A2 relative to the horizontal line and is spaced from skeleton point 603 by W3/2 on the side of point 612 relative to skeleton lines interconnecting skeleton points 601, 602 and 603, and point 615 is similarly located on the opposite side of point 612 relative to the skeleton lines.

(A.6) Stroke Outline Generating Process

The stroke outline generating process 108 shown in FIG. 1 will now be described. The stroke outline is generated with this process by interconnecting outline characteristic points with a straight line or a curve. A method of interconnecting outline characteristic points is defined for each stroke class. In the case of a "lefthand-tail" stroke, a spline curve is used for interconnecting points 611, 612 and 613 shown in FIG. 5, a bezier curve is used for interconnecting points 613, 614 and 615, a spline curve is used for interconnecting points 615, 616 and 617, a bezier curve is used for interconnecting points 617, 618 and 619, and a straight line is used for interconnecting points 619 and 611.

(A.7) Painting Process

The inner portion of the stroke ouline generated by the stroke outline generating process 108 shown in FIG. 1 is painted in the painting process 109 using a known painting method, to thereby generate a stroke.

All the strokes for one character are generated via steps 120 and 121 shown in FIG. 1. Thereafter, a character pattern for one character can be generated by subjecting all the generated strokes to a logical OR operation.

The description of the processing for the case where skeleton point coordinates are subjected to scaling has been set forth above. Next, the processing for the case where coordinates of outline characteristic points are subjected to scaling will be described.

(B) SCALING AFTER GENERATION OF OUTLINE

The stroke thickness determining process 105 is a process for determining the stroke thickness. This thickness determining process 105 is identical to the thickness determining process 102 except that the values in the table to be referred to are different. An example of the table is shown in FIG. 13.

The next edge-side angles selection process 113 is identical to the edge-side angle selection process 111.

The next edge-side shape setting process 106 is also identical to the edge-side shape setting process 103, except that when the parameter data are changed at step 402 shown in FIG. 4 in accordance with the character scaling factor, the tables for determining a stroke thickness shown in FIG. 15A are used.

Since the thickness determining process 105, edge-side angle selection process 113 and edge-side shape setting process 106 are independent from each other, the execution order of these processes is optional.

Based on the parameters including the stroke thickness, edge-side angle and edge-side shape determined by the above-described three processes and the skeleton pattern data of a normal size character stored in the disk unit 1403 shown in FIG. 12, the outline characteristic points are generated in the outline characteristic point generating process 114, which is identical to the outline characteristic point generating process 112.

At the outline characteristic point scaling process 107, the coordinates of the outline characteristic points generated in the outline characteristic point generating process 114 are multiplied by the character pattern scaling factor entered from the keyboard 1401 shown in FIG. 14.

Thereafter, processing similar to that for the case of scaling skeleton coordinates is performed by the stroke outline generating process 108 and the painting process 109 to thereby obtain a character pattern of the desired size.

The following effects can be obtained by the present invention:

Since the character size and the stroke thickness can be processed independently from each other, the quality of a character pattern can be effectively improved when character patterns of various sizes are to be generated from a single character pattern.

Further, it is possible to control the shape of the stroke at the starting and ending edge-sides, such as the angles, serif and the like so that a character of high quality can be generated.

The angle data and shape parameter data can be stored for each stroke class. These data may be stored for a particular stroke instance. Therefore, it is possible to change the shape of a particular stroke while maintaining the integration of character design. It is also easy to change the design uniformly by modifying these data for each stroke class.

The above-mentioned effects are directly derived from the present invention. In view of such effects, it is possible to generate a character pattern of high quality having various sizes and shapes from a single character pattern, thus resulting in a reduction of the capacity of memories required for storing character patterns and in a reduction of the cost for generating character patterns.

We claim:

1. A method of generating character patterns for display on a display device, each character pattern being made up of a plurality of strokes, said method comprising the steps of:
   (a) storing in a memory device stroke data representative of the positions of a plurality of skeleton points for each of the strokes making up a first character pattern and thickness data representative of the thickness of each of said strokes of said first character pattern, said plurality of strokes of said first character pattern constituting a first stroke group;
   (b) designating a first scaling factor representative of the size of the character pattern to be generated in relation to the size of said first character pattern;
   (c) determining the positions of skeleton points of a plurality of modified strokes in accordance with the first scaling factor and the positions of the skeleton points for each of the strokes of the first stroke group, the modified strokes making up a modified character pattern obtained by scaling said first character pattern by said first scaling factor and constituting a second stroke group;
   (d) determining the thickness of said modified strokes by scaling the thickness of each of the strokes of said first character pattern by a second scaling factor different from said first scaling factor;
   (e) generating an outline of each stroke of said second stroke group in accordance with the skeleton points and the thickness determined for said modified strokes to generate an outline of the character pattern; and
   (f) painting the inside of the generated outline to produce the generated character pattern.

2. A character pattern generating method according to claim 1, wherein said step (d) includes a step of determining said second scaling factor in accordance with said first scaling factor.

3. A character pattern generating method according to claim 2, wherein the step of determining said second scaling factor includes determining as said second scaling factor a value larger than said first scaling factor when said first scaling factor is larger than 1.

4. A character pattern generating method according to claim 1, wherein said step (d) includes determining the thickness of said modified strokes by multiplying the thickness stored for each of said strokes of said first character pattern by said second scaling factor.

5. A character pattern generating method according to claim 1, wherein said step (d) comprises:
   selecting one of a plurality of previously stored values associated with a plurality of ranges of said first scaling factor; and
   determining said second scaling factor based on said selected value and said first scaling factor.

6. A character pattern generating method according to claim 5, wherein said selected value indicates a ratio of said second scaling factor and said first scaling factor.

7. A character pattern generating method according to claim 6, wherein said ratio increases as said first scaling factor becomes larger.

8. A character pattern generating method according to claim 1, wherein said stored thickness data is representative of each combination of a predetermined plurality of thickness classes and a plurality of ranges of said first scaling factor, and wherein said step (d) includes selecting the thickness of said modified strokes in accordance with the combination of said first scaling factor and the thickness class of each stroke of said first character pattern.

9. A character pattern generating method according to claim 8, wherein said stored thickness data for each thickness class have a larger ratio of the thickness data to said first scaling factor as said size scaling factor becomes larger.

10. A method of generating character patterns for display on a display device, each character pattern being made up of a plurality of strokes, said method comprising the steps of:
    storing skeleton pattern data and stroke thickness data for each stroke of each of a plurality of character patterns;
    converting stored skeleton pattern data for a desired character pattern into scaled skeleton pattern data, enlarged or reduced with respect to the corresponding stored skeleton pattern data for said desired character pattern by a size scaling factor;
    generating scaled thickness data for each of said strokes of said desired character pattern based on said stored thickness data and said size scaling factor;
    generating an outline of each stroke of said desired character pattern based on said scaled skeleton pattern data and said scaled stroke thickness data, to thereby generate an outline pattern for said desired character pattern; and
    determining, when generating said outline pattern a thickness scaling factor for each stroke of said desired character pattern, having a value different from the value of said size scaling factor.

11. A method of generating character patterns for display on a display device, each character pattern being made up of a plurality of strokes, said method comprising the steps of:
    storing skeleton pattern data and stroke thickness data for each stroke of each of a plurality of character patterns;
    generating an outline of each stroke of a desired character pattern based on said skeleton pattern data and said stroke thickness data, to thereby generate an outline pattern for said desired character pattern;

converting said generated outline pattern into a scaled outline pattern, enlarged or reduced with respect to said generated outline pattern by a size scaling factor;

obtaining scaled stroke thickness data for said desired character pattern based on said stored stroke thickness data and said size scaling factor; and determining, when generating said outline pattern, a stroke thickness scaling factor for said desired character pattern, having a value different from said size scaling factor.

12. A character pattern generating method according to claim 10 further comprising:

storing thickness control data for each of a plurality of ranges of size scaling factor for said desired character pattern; and wherein when generating an outline of each stroke of said desired character pattern, the thickness of the stroke is determined by the product of said stored thickness data for said stroke and the stored thickness control data corresponding to a range including said size scaling factor for said character pattern.

13. A character pattern generating method according to claim 11 further comprising:

storing thickness control data for each of a plurality of ranges of size scaling factor for said desired character pattern; and wherein when generating an outline of each stroke of said desired character pattern, the thickness of the stroke is determined by the product of said stored thickness data for said stroke and the stored thickness control data corresponding to a range including said size scaling factor for said character pattern.

14. A character pattern generating method according to claim 10, wherein:

the storing of stroke thickness data includes storing a plurality of thickness classes discriminating the thickness of each stroke of each character pattern, and storing correspondence data indicative of the correspondence between said thickness classes and stroke thicknesses; and the determining of the thickness scaling factor is based on the thickness class of each stroke of said desired character pattern and said correspondence data.

15. A character pattern generating method according to claim 11, wherein:

the storing of stroke thickness data includes storing a plurality of thickness classes discriminating the thickness of each stroke of each character pattern, and storing correspondence data indicative of the correspondence between said thickness classes and stroke thicknesses; and the determining of the thickness scaling factor is based on the thickness class of each stroke of said desired character pattern and said correspondence data.

16. A character pattern generating method according to claim 12, wherein:

the storing of stroke thickness data includes storing a plurality of thickness classes discriminating the thickness of each stroke of each character pattern, and storing correspondence data indicative of the correspondence between said thickness classes and stroke thicknesses;

the determining of the thickness scaling factor is based on the thickness class of each stroke of said desired character pattern and said correspondence data; and said stroke thickness is determined as the product of said thickness data and corresponding thickness control data.

17. A character pattern generating method according to claim 13, wherein:

the storing of stroke thickness data includes storing a plurality of thickness classes discriminating the thickness of each stroke of each character pattern, and storing correspondence data indicative of the correspondence between said thickness classes and stroke thicknesses;

the determining of the thickness scaling factor is based on the thickness class of each stroke of said desired character pattern and said correspondence data; and said stroke thickness is determined as the product of said thickness data and corresponding thickness control data.

18. A character pattern generating method according to claim 14, wherein storing said correspondence data includes storing correspondence data for each character size scaling factor.

19. A character pattern generating method according to claim 15, wherein storing said correspondence data includes storing correspondence data for each character size scaling factor.

20. A character pattern generating method according to claim 10, wherein when said character size scaling factor is larger than 1, said thickness scaling factor is determined to be larger than said character size scaling factor, and when said character size scaling factor is smaller than 1, said stroke thickness scaling factor is determined to be smaller than said character size scaling factor.

21. A character pattern generating method according to claim 11, wherein when said character size scaling factor is larger than 1, said thickness scaling factor is determined to be larger than said character size scaling factor, and when said character size scaling factor is smaller than 1, said stroke thickness scaling factor is determined to be smaller than said character size scaling factor.

22. A character pattern generating method according to claim 10, further comprising storing a ratio between said thickness data and a code of said desired character pattern; and wherein determining the thickness scaling factor includes multiplying said stroke thickness data by said ratio so that character patterns of various stroke thicknesses can be generated even for characters of the same size.

23. A character pattern generating method according to claim 11, further comprising storing a ratio between said thickness data and a code of said desired character pattern; and wherein determining the thickness scaling factor includes multiplying said stroke thickness data by said ratio so that character patterns of various stroke thicknesses can be generated even for characters of the same size.

24. A character pattern generating method according to claim 10 further comprising storing, for each stroke of said desired character pattern, angle data indicative of an angle between the starting/ending edge-side of said stroke in the direction of thickness and a skeleton line of said stroke or a horizontal line of the frame of said character, and data for identifying said angle, and determining the outline at said starting/ending edge-side of said stroke in accordance with said angle data.

25. A character pattern generating method according to claim 11 further comprising storing, for each stroke of said desired character pattern, angle data indicative of an angle between the starting/ending edge-side of said stroke in the direction of thickness and a skeleton line of said stroke or a horizontal line of the frame of said character, and data for identifying said angle, and determining the outline at said starting/ending edge-side of said stroke in accordance with said angle data.

26. A character pattern generating method according to claim 24, wherein the storing of skeleton character data includes storing a stroke class symbol representative of each stroke class defined by a character set and a stroke data sequence comprising a position of said stroke in the frame of said desired character pattern; and wherein said method further comprises:
  storing angle data with respect to said stroke class, said angle data comprising in combination an indication of an angle representative of the direction of said outline of said stroke at the starting/ending edge-side thereof in the direction of thickness and an indication of whether said angle is relative to a skeleton line of said stroke or relative to a horizontal line of the frame of said desired character pattern; and
  selecting angle data during generating of said stroke outline such that when said angle data for said stroke are being stored, said angle data are used, and when said angle data are not being stored, said angle data with respect to said stroke class of said stroke are used instead, to thereby generate said outline of said stroke.

27. A character pattern generating method according to claim 25, wherein the storing of skeleton pattern data includes storing a stroke class symbol representative of each stroke class defined by a character set and a stroke data sequence comprising a position of said stroke in the frame of said desired character pattern; and wherein said method further comprises:
  storing angle data with respect to said stroke class, said angle data comprising in combination an indication of an angle representative of the direction of said outline of said stroke at the starting/ending edge-side thereof in the direction of thickness and an indication of whether said angle is relative to a skeleton line of said stroke or relative to a horizontal line of the frame of said desired character pattern; and
  selecting angle data during generating of said stroke outline such that when said angle data for said stroke are being stored, said angle data are used, and when said angle data are not being stored, said angle data with respect to said stroke class of said stroke are used instead, to thereby generate said outline of said stroke.

28. A character pattern generating method according to claim 26 further comprising storing for each stroke of said desired character pattern shape parameter data representative of the starting/ending edge-side shape of said stroke outline of said desired character pattern; and generating said stroke outline of said desired character pattern in accordance with said shape parameter data for said each stroke of said desired character pattern.

29. A character pattern generating method according to claim 27 further comprising storing for each stroke of said desired character pattern shape parameter data representative of the starting/ending edge-side shape of said stroke outline of said desired character pattern; and generating said stroke outline of said desired character pattern in accordance with said shape parameter data for said each stroke of said desired character pattern.

30. A character pattern generating method according to claim 29 further comprising:
  storing, for each stroke class symbol representative of a stroke class defined by a character set, shape parameter data at the starting/ending edge-side of each stroke; and
  selecting said shape parameter data during generating of said stroke outline of said desired character pattern such that when said shape parameter data for said stroke are being stored, said shape parameter data are used, and when said shape parameter data are not being stored, said shape parameter data corresponding to said stroke class are used, to thereby generate said outline of said stroke.

31. A character pattern generating method according to claim 28 further comprising:
  storing, for each stroke class symbol representative of a stroke class defined by a character set, shape parameter data at the starting/ending edge-side of each stroke; and
  selecting said shape parameter data during generating of said stroke outline of said desired character pattern such that when said shape parameter data for said stroke are being stored, said shape parameter data are used, and when said shape parameter data are not being stored, said shape parameter data corresponding to said stroke class are used, to thereby generate said outline of said stroke.

32. A character pattern generating method according to claim 31 further comprising changing the values of said shape parameter data in accordance with said character size scaling factor.

33. A character pattern generating method according to claim 28 further comprising changing the values of said shape parameter data in accordance with said character size scaling factor.

34. A character pattern generating method according to claim 29 further comprising changing the values of said shape parameter data in accordance with said character size scaling factor.

35. A character pattern generating method according to claim 30 further comprising changing the values of said shape parameter data in accordance with said character size scaling factor.

* * * * *